Jan. 25, 1966 M. MABRU 3,231,639
PROCESS FOR THE MANUFACTURE OF FINE FIBERS
OF ORGANIC THERMOPLASTIC MATERIAL
Filed May 23, 1962 4 Sheets-Sheet 1

INVENTOR
MARCEL MABRU

BY Everett F. Salter

ATTORNEY

Jan. 25, 1966 — M. MABRU — 3,231,639
PROCESS FOR THE MANUFACTURE OF FINE FIBERS
OF ORGANIC THERMOPLASTIC MATERIAL
Filed May 23, 1962 — 4 Sheets-Sheet 2

INVENTOR
MARCEL MABRU

BY *Emmett F. Salter*

ATTORNEY

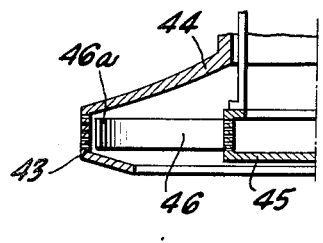
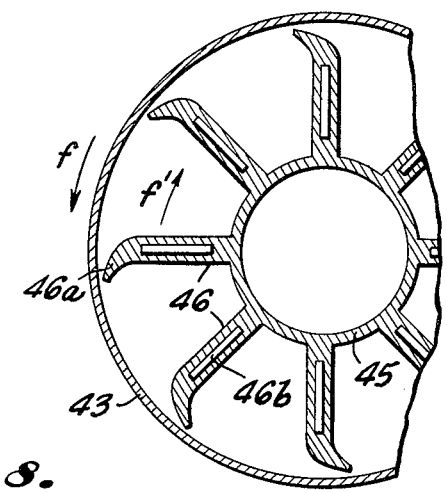
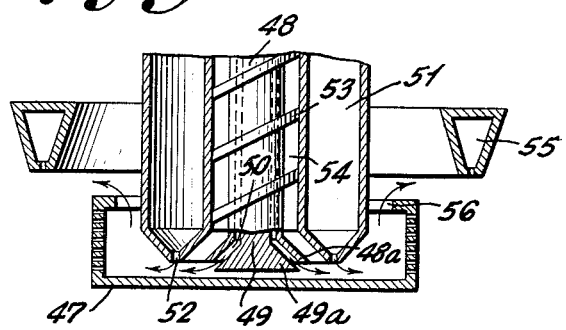
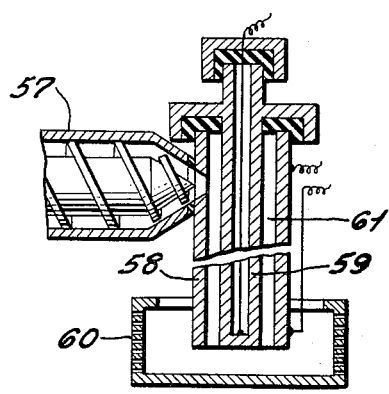
INVENTOR
MARCEL MABRU

Jan. 25, 1966  M. MABRU  3,231,639
PROCESS FOR THE MANUFACTURE OF FINE FIBERS
OF ORGANIC THERMOPLASTIC MATERIAL
Filed May 23, 1962  4 Sheets-Sheet 4
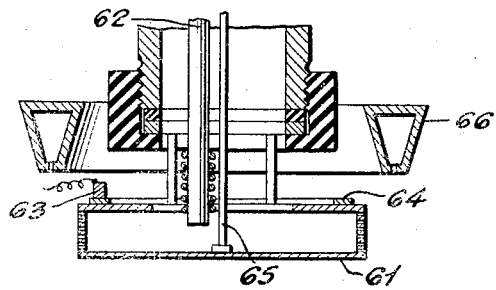
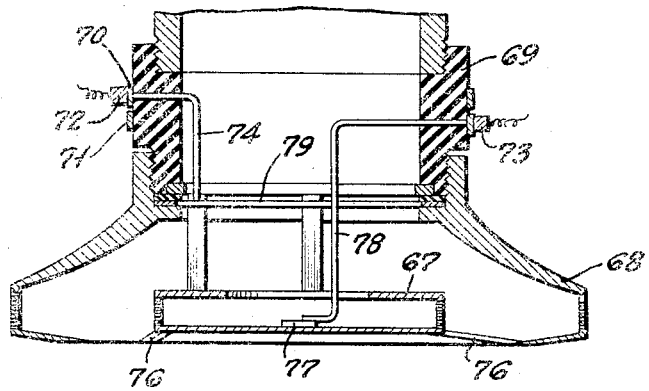
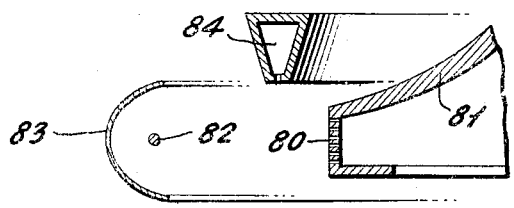
INVENTOR
MARCEL MABRU
BY Emmett F. Salter
ATTORNEY

United States Patent Office 3,231,639
Patented Jan. 25, 1966

3,231,639
PROCESS FOR THE MANUFACTURE OF FINE FIBERS OF ORGANIC THERMOPLASTIC MATERIAL
Marcel Mabru, Paris, France, assignor to Compagnie de Saint-Gobain, Neuilly-sur-Seine, France, a corporation of France
Filed May 23, 1962, Ser. No. 197,133
Claims priority, application France, June 2, 1961, 863,731, Patent 1,298,508; Jan. 27, 1962, 886,122
17 Claims. (Cl. 264—12)

The present invention relates to the manufacture of fibers of organic thermoplastic materials. It is the object of the invention to obtain fine fibers from these materials, particularly fibers of a diameter less than six microns.

The invention contemplates raising the temperature of organic thermoplastic material to a degree higher than that, which under normal conditions, would bring about its decomposition, and to subject it to a drawing-out or attenuation accompanied by a rapid cooling or chilling. It has been established that the attenuating action, which is exerted under these conditions on a material, the viscosity of which is greatly reduced, permits obtaining very fine fibers, and that the cooling action which accompanies the attenuation does not give the material time to decompose.

The temperatures to which the organic materials must be raised, which hereinafter are called "working temperatures," vary according to the nature of the materials. It is, however, possible to indicate that, in the majority of cases, working temperatures of 400° C. to 450° C. give very satisfactory results. It has been determined that when organic materials are raised to temperatures of this order, these materials are not decomposed by the heat for a heating period which may last up to a minute and a half.

The process according to the invention can be applied in particular to the manufacture of fine fibers of polyethylene, polystyrene, polyamides, polypropylene, etc. Working temperatures which can be used for these materials are given below, the time of heating being between thirty seconds and one minute thirty seconds.

| | ° C. |
|---|---|
| Polyethylenes | 400 to 450 |
| Polystyrenes | 400 to 450 |
| Polyamides | 300 to 400 |
| Polypropylenes | 390 to 450 |

According to one mode of execution of the invention, the organic material is raised immediately to the working temperature, then transformed into fibers and cooled.

According to another method of operation, the organic material is first brought to a plastic state by raising it to a temperature lower than the decomposition temperature. This material is next placed in the apparatus for fiberizing it, and the material is raised to the working temperature in this same apparatus, specifically by applying heat in contact with the apparatus. The material is then drawn-out and subjected to a cooling action.

It has been established that, in the latter case, it is particularly advantageous to raise the material to maximum temperature, that is, the working temperature, when it is immediately in advance or within the region where fiberizing occurs, this temperature being maintained only for a very short time because of the cooling action which accompanies the drawing-out of the fibers or filaments. It is thus that the organic thermoplastic material can be changed into fibers by reducing, by several tenths of a second, the duration of the working temperature, which limits the molecular breakdown of the material to a minimum, which takes place rapidly at the working temperatures which are utilized.

The drawing-out or attenuation of the organic material may be obtained by subjecting it, in the form of threads or filaments, to the action of jets or currents of gas. The formation of threads or filaments may be realized by passing the material through spinning orifices, or by centrifuging procedures executed by means of a hollow body rotated about its axis and provided on its periphery with orifices through which the material introduced into this body is projected by centrifugal force.

Other characteristics and advantages of the invention will appear from the description which follows, and which relates to different embodiments of the invention, which are illustrative thereof and not limitative.

In this description reference is made to the attached drawings, wherein:

FIGS. 4 to 12 are sectional views of different arrangements of centrifuge for discharging viscous thermoplastic material by centrifugal force and for reducing the duration of the time that the material is maintained at its working temperature.

Figure 1:
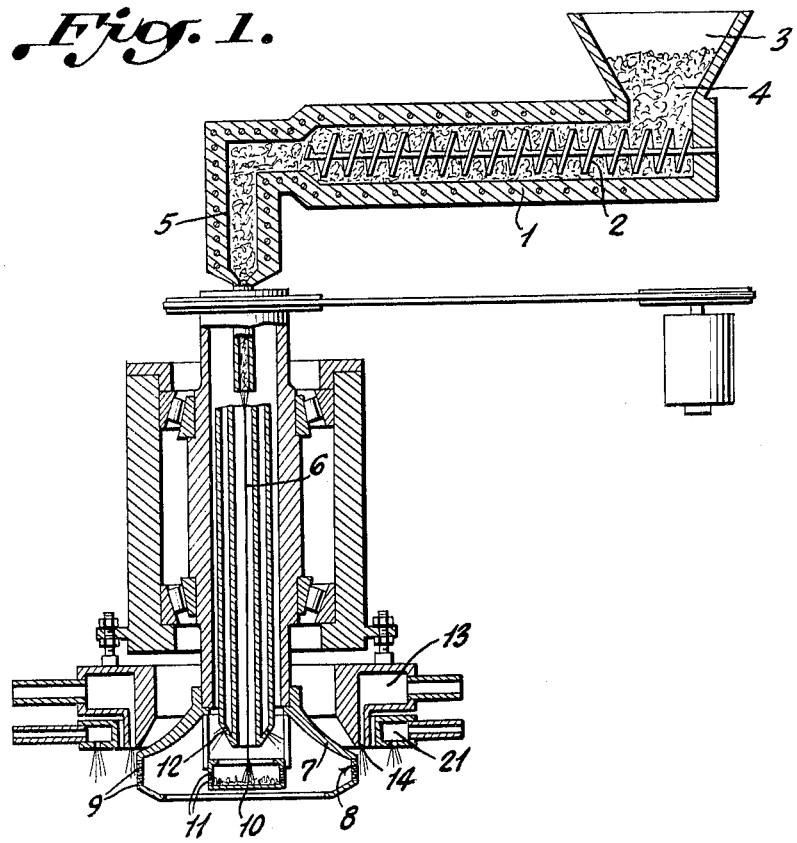
FIG. 1 is a vertical sectional view of one embodiment of the invention.

In the embodiment of the invention shown in FIG. 1, the apparatus, for executing the inventive method herein, comprises a body 1 which is heated and in which a screw 2 turns. At one of the extremities, the body 1 is provided with a hopper 3 for the introduction thereinto of organic thermoplastic material 4. At its other extremity, the body terminates in a head 5, also heated, through which the thermoplastic material is discharged in the form of a thread 6. This thread falls into the fiberizing apparatus constituted by a hollow body 7, turning at high speed about its axis, and with the peripheral band or wall 8 thereof provided with one or several rows of perforations or orifices 9. The thread of thermoplastic material is received within basket 10 integral with the rotating body, this basket also being provided with perforations 11, through which the organic material is projected, under the effect of centrifugal force, onto the peripheral band 8. The material, raised to a temperature of, for example, 400° C. to 450° C., is then projected by centrifugal force through orifices 9 of band 8 in the form of filaments.

The material may be raised to a temperature of 400° C. to 450° C. at the time of its passage through the twisting extruder body 1. It may also be pre-heated in the extruder body 1 and raised to the above temperature in the fiberizing apparatus. For this purpose, additional heating means may be provided such as, for example, a supply of hot gases 12 placed in the rotating body, or an exterior winding, coaxial with the peripheral band, which winding may be traversed by a high frequency current heating said band by induction. This heating may also be furnished by di-electric losses characteristic of dielectric heating. These additional means of heating may also be combined.

An annular chamber 13, provided with a continuous slot 14, or a plurality of slots, is disposed co-axially with respect to the rotary centrifuge 7. Currents of hot gas are blown from chamber 13 through annular slot 14, which act on the filaments in order to start their drawing-out and their transformation into fine fibers, these fibers then being subjected to rapid cooling. This cooling action can be accomplished solely by air induced by the currents issuing from the chamber 13, or may be augmented by means of additional gaseous currents, such as those coming from an annular chamber 21, or by spraying of finely divided liquid.

Figure 2:
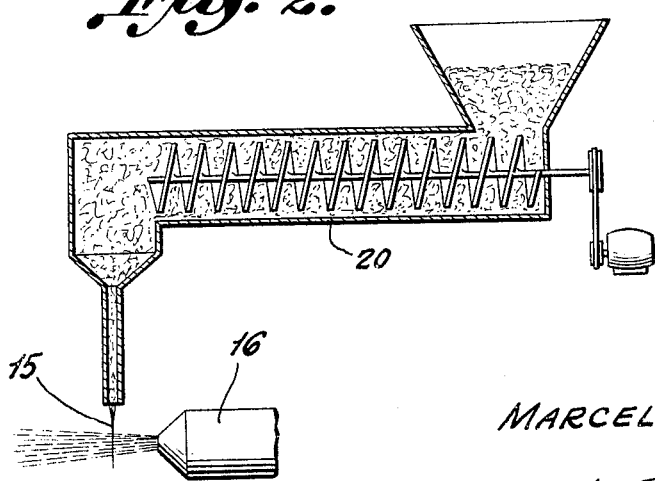
FIG. 2 is a schematic view of a variation of the embodiment shown in FIG. 1.

In the variation shown in FIG. 2, a device 20 is used, analogous to the extruder 1 in the embodiment shown in FIG. 1, which delivers a thread of material 15 at a temperature which may be of the order of 400° C. to 450° C. This thread of material traverses the gaseous current issuing from a nozzle 16 to effect the drawing-out of the stream 15 into fine fibers. This gaseous current may be, for example, a current of air or steam. Cooling of the material may be realized as has just been indicated above.

Figure 3:
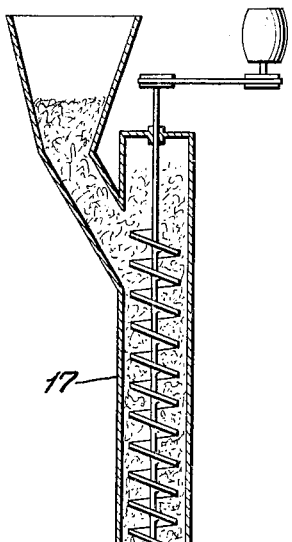
FIG. 3 is a schematic view of another variation of the embodiment shown in FIG. 1.

In the embodiment shown in FIG. 3, the extruding device 17, which may be heated, is disposed vertically and delivers a thread of material 18, the temperature of which may have the above-mentioned value. The stream 18 passes into the gas jets, particularly of air, issuing from an annular blower crown 19. These gas jets effect the drawing-out or attenuation of the thread. Cooling may be realized as indicated above. The gas jets may be concurrent with the vertical dropping thread. Alternatively, an apparatus as disclosed in French Patent No. 1,009,288, owned by the assignee of the instant application, may be used. According to the device disclosed in this patent, the gas jets form a sheaf surrounding this thread without meeting it, their axes presenting an inclination with respect to the axis of the thread and disposed on a closed line surrounding the thread and not in contact with it, with this closed line being situated at a level corresponding to the constriction zone of the sheaf. The axes of the jets may be arranged particularly according to the generatrices of a hyberboloid of revolution. The flow of the gases thus arranged creates a vortex which all at once results in a movement directed along the axis of the thread of the material and rotation about the axis, which gives rise to a particularly effective drawing-out or attenuation.

Figure 4:
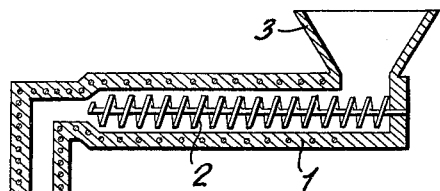
Figure 4:
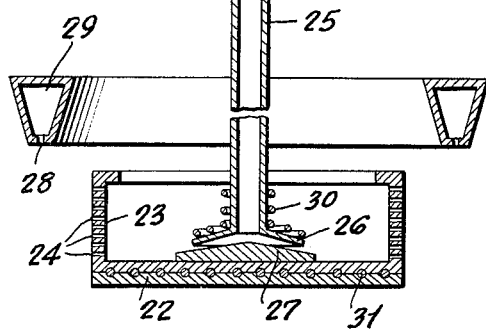

In the embodiment of the invention shown in FIG. 4, the centrifuging device comprises a rotating body 22 having a peripheral band 23 which is pierced with holes 24 through which the organic thermoplastic material is projected in the form of filaments. This material is first conducted through hopper 3 into the body 1 of an extruder provided with a screw 2. Body 1 is heated in order to raise the material to a temperature definitely below working temperature, for example, 230° C. in the case of propylene. The material thus heated passes into a tube 25 placed along the axis of rotating body 22 and which ends in a cone 26. A conic piece 27 is affixed to the base of the rotating body co-axially therewith. Preferably the conicities of elements 26 and 27 are such that the spacing between the two pieces decreases from the axis to the periphery to form an annular passage of decreasing section. Thereby, the material, in the course of its travel between the two cones 26 and 27, the first being fixed and the second rotatable, is subjected to energetic rolling which has the effect of increasing its temperature by reason of the friction and rubbing proceeding therefrom.

The material is thus raised to working temperature, which may be of the order of 380° C. to 400° C. immediately before it arrives at the inner surface of the peripheral wall 23. After its projection through orifices 24 in the form of threads, the material is transformed into fine fibers by the action of gaseous currents issuing from slots or orifices 28 of an annular chamber 29 arranged coaxially with the rotating body, this drawing-out being accompanied by rapid cooling of the material. Thus, the material is raised to its working temperature for only a short period of time, thereby reducing its breakdown.

It is possible to provide heating means at the base of tube 25 and on cone 26 as well as in the rotary body 22. These heating means are shown schematically by coils 30 and 31.

Figure 5:
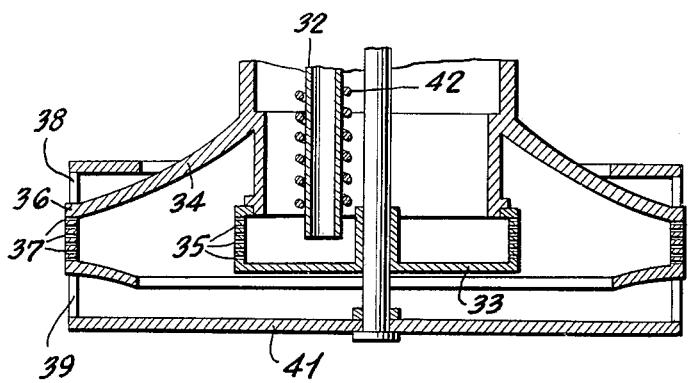
Figure 5:
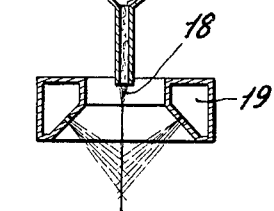

In the embodiment of the invention shown in FIG. 5, the organic material is heated to a temperature below its working temperature and is introduced by tube 32 into a distributor basket 33 fixed to the rotary body 34. The basket is provided with orifices or perforations 35 through which the material is projected against the internal face of the peripheral band or wall 36 of the rotating body. The peripheral wall 36 is provided with orifices 37 through which the material is projected in the form of filaments.

In this arrangement, heating of the peripheral band 36 is attained by the passage of an electric current across said band. The current passes through brushes 38–39 rubbing against the band, those brushes being supplied by conductors 40 and 41. The material is thus raised to its working temperature at the moment when it is in contact with the band. Its transformation into fibers and its cooling are realized as above by the action of gaseous currents acting on the threads after they are projected from the rotating body.

It is possible to heat the supply tube 32 for the material by providing a heating coil 42 therefor.

FIG. 6 and 7 show an arrangement according to which the material is raised to its working temperature also upon its reaching the peripheral band 43 of a rotating centrifuge body 44 which rotates in the direction of arrow *f*. For this purpose, distributor basket 45, turning in the reverse direction of arrow *f*′ is provided with a plurality of radially extending arms 46 having the extremities thereof shaped as paddles, so that the material which is fed into the basket at a temperature below its working temperature is projected therefrom onto the inner face of the peripheral wall 43 and is rolled or flattened on the wall and thus is raised to its working temperature.

Heating may be provided to help rise the material to its working temperature, such as electrical resistances 46*b* in arms 46. It is also possible to combine with the heating action obtained through friction of the material between the extremities of arms 46 and wall 43, a heating of the peripheral wall by the Joule effect, according to an arrangement of the type shown in FIG. 5.

In the embodiment of the invention shown in FIG. 8, the apparatus comprises the rotary centrifuge body 47 and a tubular member 48 co-axial therewith. A cylindrical core 49 is fitted within member 48 to form an annular channel or duct 50. The lower ends of tubular member 48 and core 49 terminate in conically shaped parts 48*a* and 49*a*, respectively. An annular chamber 51, ending in a continuous slot 42 or in a series of orifices, surrounds member 48 and is concentric therewith. A helicoidal vane or partition 53 is disposed between the annular chamber 51 and tube 48 and forms part of the latter to rotate therewith.

The material is introduced at the upper part of the apparatus at a temperature below its working temperature. It traverses space 54 between the internal wall of chamber 51 and the tubular member 48 in a helical path. Tubular member 48 and rotating body 47 may turn in opposite directions or in the same direction at different speeds. Chamber 51 and space 50 are themselves traversed by a hot fluid so that the temperature of the material is raised until it attains its working temperature at the moment when it reaches the rotating body 47. The gases leaving channel 50 and chamber 51 are evacuated through annular opening 56 at the top of the rotating body, and contribute to its heating and to that of the material conducted to the centrifuge body.

The drawing-out and cooling of the threads of material projected outside the rotating body are executed in the manner described above by gaseous currents issuing from annular chamber 55.

In the mode of execution shown in FIG. 9, the organic thermoplastic material issuing from an extruder 57 at a temperature below its working temperature is conducted into annular chamber 61 between an exterior tube 58 and interior tube 59, arranged concentrically and co-axially with rotating centrifuge body 60. Exterior tube 58 and interior tube 59 are heated by passage of a current across their mass so as to bring the material to its working temperature within the rotating body. The extruder is insulated electrically from outer tube 58.

In the embodiment shown in FIG. 10, the organic thermoplastic material is fed into the rotating centrifuge body 61 at a temperature below its working temperature by means of conduit 62 which may be heated by an externally disposed heating coil. The rotating body itself is heated by passage of a current conducted by brush 63 in contact with a ring 64 fixed to said body with the other pole of the source connected to a conductor 65 in rotating contact with the center of body 61. The material is thus raised to its working temperature, and is subjected, as described above, to a drawing-out action and cooling by gaseous currents issuing from annular chamber 66.

The embodiment shown in FIG. 11 comprises a metallic basket 67, in which the organic material is brought to a temperature below its working temperature, disposed within rotating centrifuge body 68. Rings 70 and 71 are provided on the circumference of the annular member 69 of insulating material and brushes 72 and 73 rub against these respective rings. Ring 70 is connected by conductor 74 to a metallic disk 79 in contact with the rotating body. The current is thus conducted to the rotating body, passes across its peripheral wall and through conductors 76 extending from the edges of the opening in the bottom of the centrifuge to the distributor basket 67, thereby linking the metallic body 68 and metal basket 67, and from there the current passes through central plug 77 and conductor 78 to ring 71. The elevation of temperature due to the passage of the current in the rotating body raises the organic material to its working temperature.

In the embodiment shown in FIG. 12, the peripheral band 80 of a rotating body 81 is heated by exterior means constituted by an electrical resistance 82 placed at the focus of an elliptical reflector 83 directing heat rays toward the peripheral band. The material is thus raised to its working temperature upon contact with the peripheral band. Drawing-out into fibers and cooling of the material are accomplished by gaseous currents issuing from annular chamber 84.

I claim:

1. The method of manufacturing fine fibers, in particular fibers of a diameter of less than six microns, from organic thermoplastic material selected from the group consisting of polyethylenes, polystyrenes, polyamides and polypropylenes, which comprises first raising the material to a temperature above that which would result normally in its thermal decomposition for no longer than one and one-half minutes, forming at least one stream from said material, submitting said stream to the action of inert gaseous currents at comparatively low temperature and particularly at a temperature lower than that at which the material is decomposed, so as to divide said stream into fine fibers, said limited heating of the material to said high temperature having no deleterious effect upon the resultant fibers.

2. The method set forth in claim 1 wherein the transitory heating of the organic thermoplastic material ranges from 300° C. to 450° C.

3. The method of manufacturing fine fibers, in particular fibers of diameters of less than six microns from organic thermoplastic material, which comprises raising the material to a temperature above that which would result normally in its thermal decomposition for a short period of time only and no longer than one and one-half minutes, fiberizing the material during said period by centrifuging the heated material through a plurality of fine orifices in the peripheral wall of a hollow centrifuge body, attenuating the fibers issuing from the orifices and directing a relatively cool inert gaseous blast transversely to the planes of projection of said fibers to arrest the decomposition of the plastic material.

4. The method of manufacturing fine fibers, in particular fibers of diameters of less than six microns from organic thermoplastic material, heating the material in separate stages and finally raising it to a temperature which would result normally in its thermal decomposition for a short period of time only and no longer than one and one-half minutes, fiberizing the material during said period by centrifuging the heated material through a plurality of fine orifices in the peripheral wall of a hollow centrifuge body, attenuating the fibers issuing from the orifices, and directing a relatively cool inert gaseous blast transversely to the planes of projection of said fibers to arrest the decomposition of the plastic material.

5. The method set forth in claim 4 wherein the final heating of the material is executed by heating the material at the point of discharge thereof into the centrifuge body.

6. The method set forth in claim 4 wherein the final heating of the material is executed by heating the peripheral wall of the centrifuge body by electrical energy.

7. The method set forth in claim 4 wherein the final heating of the material is executed by heating the peripheral wall of the centrifuge body with a current of hot gas sweeping across the external surface thereof.

8. The method set forth in claim 1 wherein the cool gaseous currents are directed transversely through the stream of heated thermoplastic material.

9. The method set forth in claim 1 wherein the cool gaseous currents are directed in a vortex surrounding the stream of thermoplastic material and traveling in the same general direction as said material.

10. The method of manufacturing fine fibers, in particular fibers of diameters of less than six microns from organic thermoplastic material, selected from the group consisting of polyethylenes, polystyrenes, polyamides and polypropylenes, which comprises first raising the material to a temperature of the order of 300° C. to 450° C. which is above that which would result normally in its thermal decomposition, and bringing said material for a very short time, in particular for less than one and one-half minutes, to its working temperature, therafter fiberizing the material, attenuating the fibers and cooling them rapidly to avoid the decomposition of the material.

11. The method set forth in claim 4 wherein the final heating of the material is executed by frictional heat caused by forcing the plastic material through a convergent passage of conic section defined by relatively moving surfaces to effect an energetic rolling of the material through said passage immediately prior to the projection of the material through the fine orifices in the wall of the centrifuge.

12. The method set forth in claim 11 wherein the heating of the material through the passage of conic section is enhanced by heating at least one of the surfaces defining said passage externally of said passage.

13. The method set forth in claim 12 which includes heating the thermoplastic material immediately prior to the travel thereof through said passage.

14. The method set forth in claim 4 which includes supplying the organic thermoplastic material to the inner face of the peripheral wall of the centrifuge body by the centrifugal projection thereof from a distributor basket in the interior of said body, and heating the material to its highest temperature by blowing hot gases thereon in the course of its travel from the distributor basket to the peripheral wall.

15. The method set forth in claim 4 which includes supplying the organic thermoplastic material to the inner face of the peripheral wall of the centrifuge body by the centrifugal projection thereof from a distributor basket in the interior of said body, and heating the material to its highest temperature at the inner face of the peripheral wall by frictional heat developed by rotary paddles integral with the distributor rotating in the reverse direction relative to the centrifuge body and terminating adjacent to said inner face.

16. The method as set forth in claim 15 which includes heating the paddles internally to impart heat to the thermoplastic material in the course of its travel from the distributor basket to the peripheral wall.

17. The method set forth in claim 4 wherein the final heating of the material is executed by frictioinal heat.

References Cited by the Examiner

UNITED STATES PATENTS

| | | | |
|---|---|---|---|
| 1,441,904 | 1/1923 | Bancroft | 18—47.3 |
| 1,601,897 | 10/1926 | Wiley et al. | |
| 2,192,944 | 3/1940 | Thomas. | |
| 2,335,757 | 11/1943 | Hall | 264—12 XR |
| 2,371,105 | 3/1945 | Lepsoe | 264—12 XR |
| 2,374,540 | 4/1945 | Hall | 264—12 XR |
| 2,582,561 | 1/1952 | Peyches. | |
| 2,605,500 | 8/1952 | Powell | 264—12 XR |
| 2,612,654 | 10/1952 | O'Connor | 18—47.3 |
| 2,816,826 | 12/1957 | Brennan | 264—12 XR |
| 2,862,242 | 12/1958 | Jones et al. | 18—47.3 |
| 2,897,874 | 8/1959 | Stalego et al. | |
| 2,988,469 | 6/1961 | Watson | 264—12 XR |
| 2,991,507 | 7/1961 | Levecque et al. | |
| 2,994,102 | 8/1961 | Payton | 18—2.6 |
| 3,055,049 | 9/1962 | De Bruyne et al. | 18—2.6 |
| 3,084,381 | 4/1963 | Levecque et al. | 264—12 XR |

FOREIGN PATENTS

| | | |
|---|---|---|
| 609,560 | 10/1948 | Great Britain. |
| 832,815 | 4/1960 | Great Britain. |

OTHER REFERENCES

Man-Made Textile Encyclopedia, edited by Press, published in 1959 by Textile Book Publishers, Inc. (Division of Interscience Publishers, Inc.); relied upon are pp. 80–83; copy in Sci. Lib.

ALEXANDER H. BRODMERKEL, *Primary Examiner.*
MICHAEL V. BRINDISI, *Examiner.*